United States Patent [19]
Aharoni et al.

[11] Patent Number: 6,014,694
[45] Date of Patent: Jan. 11, 2000

[54] SYSTEM FOR ADAPTIVE VIDEO/AUDIO TRANSPORT OVER A NETWORK

[75] Inventors: Amir Aharoni, Herzelia; Stas Khirman, Hod Hasharon; Eugene Taits, Kfar Saba; Oren Ariel, Ramat Hasharon, all of Israel

[73] Assignee: Citrix Systems, Inc., Fort Lauderdale, Fla.

[21] Appl. No.: 08/884,531

[22] Filed: Jun. 26, 1997

[51] Int. Cl.[7] .................. H04N 7/14; H04H 1/02; H04J 3/16
[52] U.S. Cl. ............... 709/219; 348/12; 348/13; 455/5.1; 370/232; 370/468
[58] Field of Search .................. 395/200.47–200.49; 709/217–219; 348/6, 7, 10, 12, 13; 455/3.1, 4.1, 4.2, 5.1, 6.1, 6.2, 6.3; 370/229–234, 464, 465, 468

[56] References Cited

U.S. PATENT DOCUMENTS 5,604,731  2/1997  Grossglauser et al. .................. 370/232

FOREIGN PATENT DOCUMENTS

| 0643514 | 3/1996 | European Pat. Off. | ......... H04L 12/00 |
| 0739140 | 10/1996 | European Pat. Off. | ......... H04N 7/26 |
| 6-125363 | 5/1994 | Japan | ............... H04L 12/56 |
| WO 9520863 | 8/1995 | WIPO | ............... H04N 7/26 |

OTHER PUBLICATIONS

Patent Abstracts of Japan vol. 018, No. 416 (E–1588) Aug. 4, 1994.
Anonymous: "Method to Deliver Scaleable Video across a Distributed Computer System" IBM Technical Disclosure Bulletin, vol. 37, No. 5, May 1994, pp. 251–256, XP002079782 New York, USA.
Campbell A., et al.: "Meeting End–To–End QOS Challenges for Scaleable Flows in Heterogeneous Multimedia Environments" High Performance Networking 6, IFIP 6th International Conference on High Performance Networking (HPN). Palma De Mallorca, Sept. 13–15, 1995. No. Conf. 6, Sep. 11, 1995, pp. 101–114, XP000624330 Puigjaner R. (ED).

*Primary Examiner*—John W. Miller
*Attorney, Agent, or Firm*—Testa, Hurwitz & Thibeault, LLP

[57] ABSTRACT

A system for adaptively transporting video over networks wherein the available bandwidth varies with time. The system comprises a video/audio codec that functions to compress, code, decode and decompress video streams that are transmitted over networks having available bandwidths that vary with time and location. Depending on the channel bandwidth, the system adjusts the compression ratio to accommodate a plurality of bandwidths ranging from 20 Kbps for POTS to several Mbps for switched LAN and ATM environments. Bandwidth adjustability is provided by offering a trade off between video resolution, frame rate and individual frame quality. The system generates a video data stream comprised of Key, P and B frames from a raw source of video. Each frame type is further comprised of multiple levels of data representing varying degrees of quality. In addition, several video server platforms can be utilized in tandem to transmit video/audio information with each video server platform transmitting information for a single compression/resolution level.

11 Claims, 13 Drawing Sheets

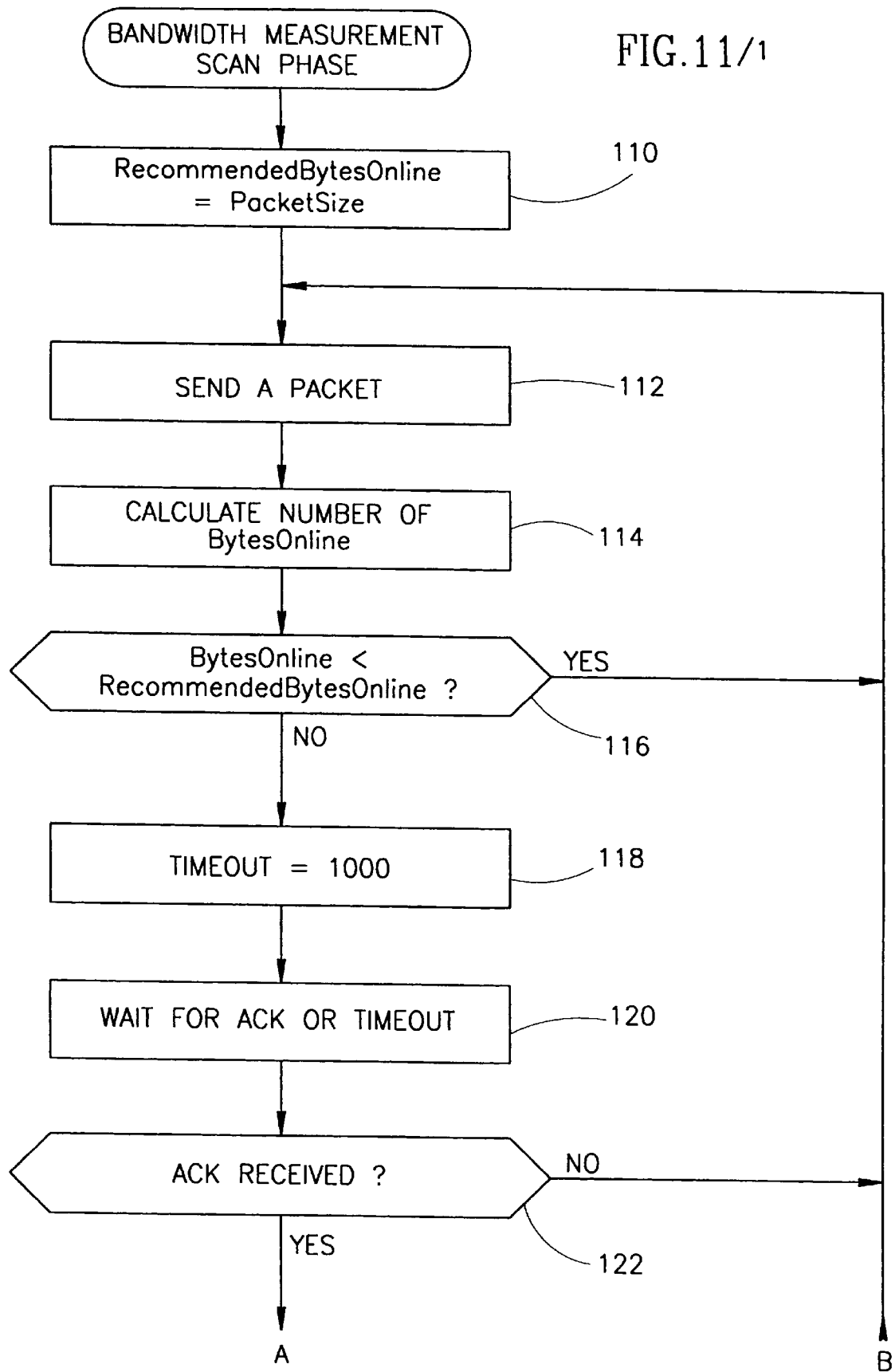
FIG. 11/1

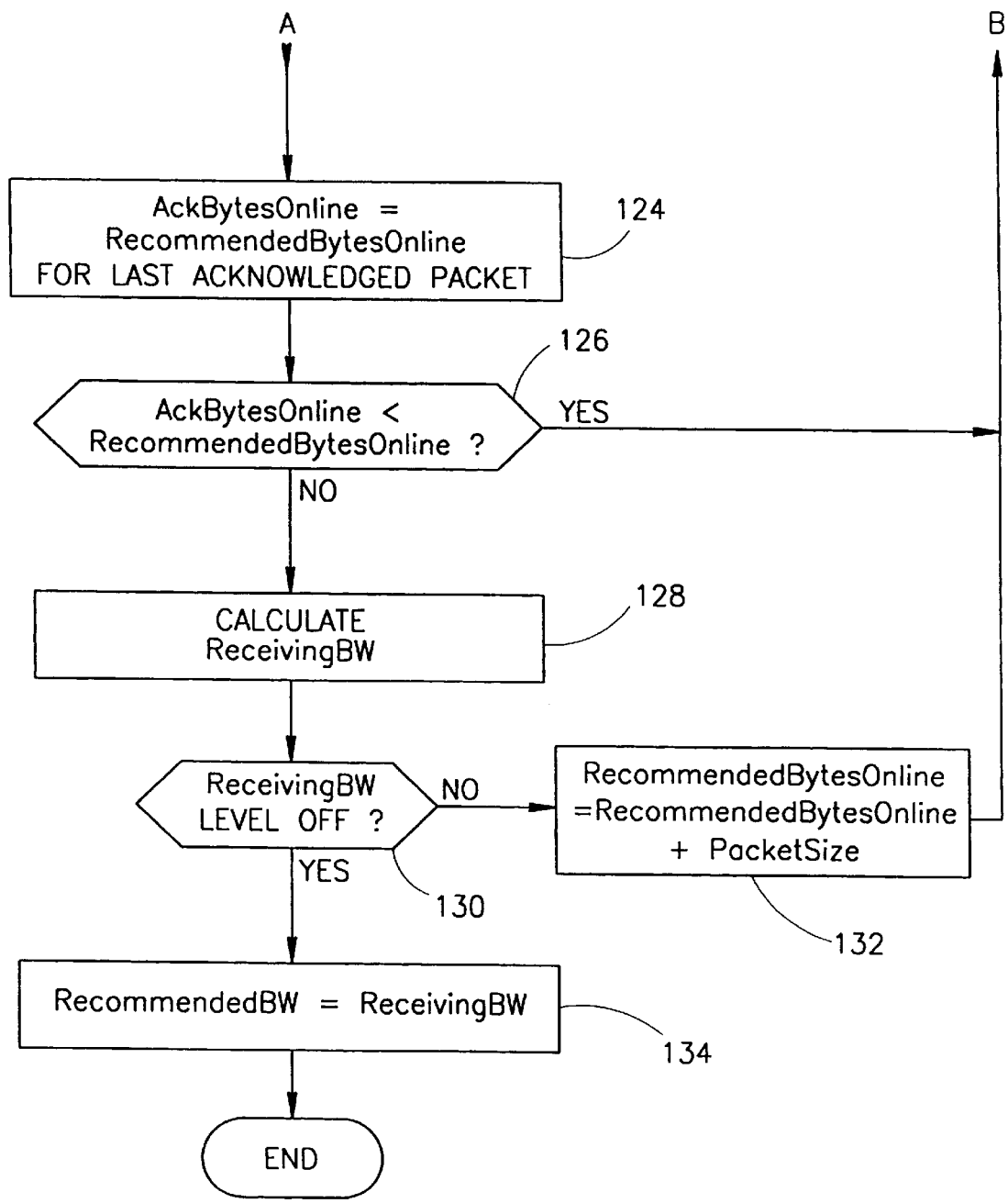
FIG.11/2

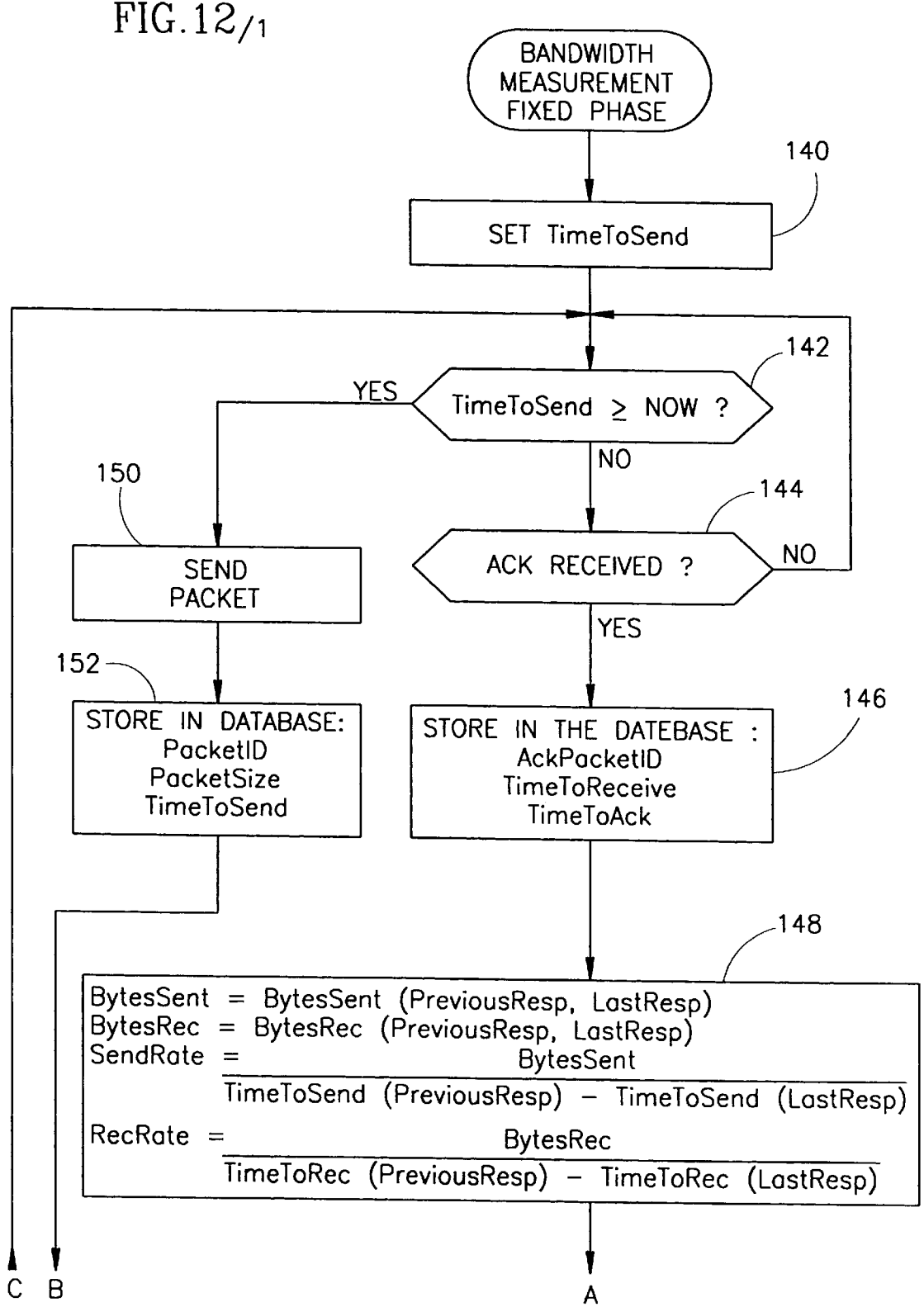

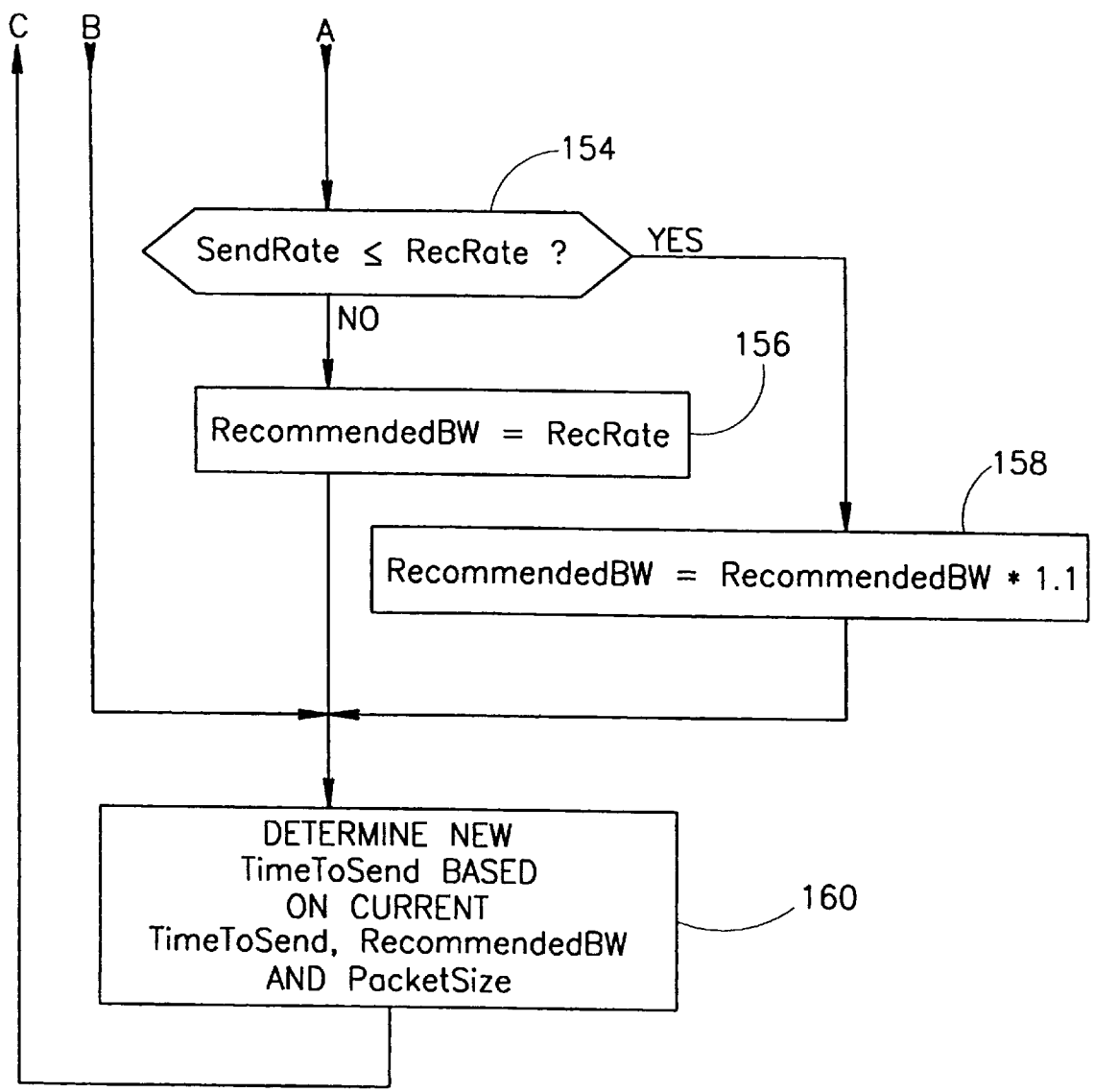
FIG.12/2

SYSTEM FOR ADAPTIVE VIDEO/AUDIO TRANSPORT OVER A NETWORK

FIELD OF THE INVENTION

The present invention relates generally to transport of video and audio information over networks and more particularly relates to adapting the transport of video and audio information over IP networks having varying bandwidth capacities.

BACKGROUND OF THE INVENTION

Traditionally, most, if not all, of the content found on the Internet today is text and image based. While video content can add tremendous new excitenent and value to the Internet in the form of advertismg, online training, video conferencing and many other functions, these types of applications are rare today. Even when they do exist, the quality of the overall experience is poor. In addition, most often, the cost is prohibitively too high for wide scale deployment.

The Internet and other TCP/IP networks are challenging environments in which to deliver streaming real time audio/video. The bandwidth available over a connection at any particular instant varies with both time and location. This variation in bandwidth causes entire packets containing substantial audio/video content to be lost. In addition, the latency through the network, causing the video that is ultimately displayed to 'jitter' or lose clarity at the client. These factors may be tolerable for file transfer traffic where jitter does not matter since high level protocols correct for errors and losses. They do, however, make data delivery difficult for real time audio/video streaming applications.

A major challenge in transporting video over TCP/IP networks is that video requires much higher bandwidth than most other types of data objects. To illustrate, consider that the raw data required for a one hour movie shown at a resolution of 640×480 at 30 fps is approximately 100 GB, To transmit this uncompressed raw video over a 10 Mbps Ethernet link would take approximately 22 hours. The transmit the same video over a 28.8 Kbps modem would take approximately 320 days, Thus, it is clear, that for practical purposes, video must be heavily compressed for real time video transmission over a network have finite speed.

Another major challenge to transporting video over TCP/IP networks or any network generally, is coping with variable bandwidth. Two aspects of bandwidth variation include time dependent bandwidth variation and site dependent bandwidth variation. Time dependent bandwidth variation is due to changes in network traffic because the network is a shared resource. Site dependent bandwidth variation arises from the fact that the video data stream is, in many video related applications, sent to multiple sites. The connections from the server to each site typically have varying available bandwidths. For example, even within the same building, one recipient may be on a local area network (LAN) while another recipient may be connected via an integrated services digital network (ISDN) line. Thus, it would be usefuil if available bandwidth was dynamically measured and this measurement used to provide optimum quality video to each site. This would mniinimize any waste of network resources and reduce CPU resource usage.

Current video transport or delivery systems essentially ignore the problems of transporting video over TCP/IP networks as discussed above. These systems provide a simple control to the sender or creator of the video stream that functions to select a particular video transmission bandwidth. A common solution is to select a target transmission bandwidth as the lowest common bandwidth for all recipients. This solution results in poorer quality for users with access to higher bandwidth. Another common solution is to pump in video data based on the capabilities of the source, thus allowing the downstream network routers to drop the packets as needed. This solution results in wasted network resources.

SUMMARY OF THE INVENTION

The present invention is a system for adaptively transporting video over networks wherein the available bandwidth varies with time. The present invention has application to any type of network including those that utilize the Internet Protocol (IP) such as the Internet or other TCP/IP networks. The system comprises a video/audio codes or coder/decoder that functions to compress, code, decode and decompress video streams that are transmitted over networks having available. bandwidths that vary with time and location. Depending on the channel bandwidth, the system adjusts the compression ratio to accommodate. a plurality of bandwidths ranging from 20 Kbps for plain old telephone service (POTS) to several Mbps for switched LAN and ATM environments. Bandwidth adjustability is provided by offering a trade off between video resolution (e.g., 160×120, 320×240, 640×480), frame rate (e.g., B30 fps, 15 fps, 7.5 fps) and individual frame quality. This flexibility is usefuil for different applications that stress different requirements.

The system functions to generate a prioritized video data stream comprising multiple levels from a raw source of video. This video stream is stored in a file and accessed by the video server when servicing clients. In operation, the video client only receives a subset of the levels. The levels are chosen to have a suitable data content to match that of the network connection. This permits a better fit between network bandwidth consumed and video image quality. Each of the levels is built on top of the previous levels, with the higher levels providing incremental information not present in the lower levels. This ensures that bandwidth is not wasted on the client end or on the encoder/server side. The system generates the video stream that is sent to the client such that a loss of any individual packet on the network will not cause sustained deged quality at the client The scaleable compression performed by the system is suitable for transparent video within an Internet environment characterized by large diversity and heterogeneity. The system functions to match the image quality of the video data being transported with the wide variations in available network bandwidth. In addition, the system can adjust the video data to match the differences in available computing power on the client computer system. The system, utilizing 'best effort' protocols such as those found on the Internet, adapts to the time varying nature of the available bandwidth.

There is therefore provided in accordance with the present invention a method of transporting video over a network channel, comprising the steps of compressing a raw video source into a plurality of frames, each frame comprising a plurality of levels, each level corresponding to a particular degree of compression, estimating the bandwidth of the network channel, selecting one of the plurality of levels of each frame to transmit over the network channel in accordance with the bandwidth estimate whereby the level selected optimizes the use of the bandwidth of the network channel, and sending the selected level of each frame over the network channel.

The step of compressing comprises the step of compressing the raw video source into a plurality of different types of frames, each frame type containing different amount of video content information, the plurality of different types of frames grouped so as to form a video stream consisting of a plurality of group of pictures (GOP) sequences. The step of compressing comprises the step of compressing the raw video source into Key, P and B type frames, the Key, P and B frames generated so as to form a video steam consisting of a plurality of group of pictures (GOP) sequences.

There is also provided in accordance with the present invention a method of transporting video from a video server to a video client over a network channel, comprising the steps of compressing data from a raw video source so as to generate a plurality of frames, each frame being of a particular frame type, each frame type containing a particular amount of video content information, each frame comprising a plurality of levels, each level corresponding to a particular degree of compression, estimating the bandwidth of the network channel, deter the amount of video information waiting to be displayed at the video client, selecting one of the plurality of levels of each frame to send over the network channel in accordance with the bandwidth estimate whereby the level selected optimizes the use of the bandwidth of the network channel, choosn which frames having a particular frame type to send over the network channel in accordance with the amount of video information waiting to be displayed at the video client, and sending the chosen frames having a particular frame type and of the selected level over the network channel.

Further, there is provided in accordance with the present invention a video server for transporting video from a video source over a network channel to a video client, the video source consisting of a plurality of frames of video data, each frame of video data consisting of multiple compression levels and being of a particular type, the video server comprising receiver means for inputting frames of video data from the video source, sending means coupled to the receiver means, the sending means for determining which compression level within the frame and which frames having a particular type to transmit in accordance with the estimated available bandwidth of the network channel, the sending means for encapsulating the frames of video data into a plurality of packets for transmission over the network channel, and a controller for managing the operation of the receiver means and the sending means whereby the rate of transmission of the sending means is maintained so as to match the available bandwidth of the network channel.

In addition, the sending means comprises a rate control unit for measuring the available bandwidth of the network channel, a frame selector for inputting video frame data output by the receiver means, the frame selector outputting frames of a particular compression level in accordance with the bandwidth measured by the rate control unit, a packet generator for inputting video frame data output by the frame selector, the packet generator for encapsulating the video frame data into a plurality of packets for transmission, the packet generator determining which frames having a particular type are to be transmitted, a packet transmitter for placing onto the network channel the plurality of packets output by the packet generator, and a receiver for receiving acknowledgments sent by the video client over the network channel in response to packets received thereby.

There is further provided in accordance with the present invention a method of measuring the bandwidth of a network channel connecting a sender to a receiver, the method comprising the steps of the sender transmitting a plurality of packets to the receiver over the network channel to yield a particular number of bytes online, the receiver transmitting to the sender acknowledgments in response to the receipt of the packets by the receiver, measuring the reception bandwidth of the packets by the receiver, increasing the number of bytes online until the rate of increase of the reception bandwidth decreases to within a predetermined threshold, and estimating the bandwidth of the network channel to be the reception bandwidth at the receiver.

In addition, there is provided in accordance with the present invention a method of maintaining a maximum number of bytes online in a network channel connecting a sender to a receiver, the network channel having a particular available bandwidth, the method comprising the steps of determining the number of bytes sent (BytesSent) to the receiver utilizing sender related data concerning the previous packet sent and the last packet sent, determining the number of bytes received (BytesRec) by the receiver utilizing receiver related data concerning the previous packet received and the last packet received, calculating the sending rate (SendRate) in accordance with the following equation $$SendRate = \frac{BytesSent}{TimeToSend(PreviousResp) - TimeToSend(LastResp)},$$

calculating the receiving rate (RecRate) in accordance with the following equation $$RecRate = \frac{BytesRec}{TimeToRec(PreviousResp) - TimeToRec(LastResp)},$$

comparing the sending rate to the receiving rate, increasing the sending rate if the sending rate is less than or equal to the receiving rate, and decreasing the sending rate if the sending rate is greater than the receiving rate.

There is also provided in accordance with the present invention a method of transporting video from a video server to a video client over a network channel, comprising the steps of compressing data from a raw video source so as to generate a plurality of frames, each frame being of a particular frame type, each frame type containing a particular amount of video content information, each frame comprising a plurality of levels, each level corresponding to a particular degree of compression, estimating the bandwidth of the network channel, determining the amount of video information waiting to be displayed at the video client, selecting one of the plurality of levels of each frame to send over the network channel in accordance with the bandwidth estimate whereby the level selected optimizes the use of the bandwidth of the network channel, choosing which frames having a particular frame type to send over the network channel in accordance with the amount of video information waiting to be displayed at the video client, sending the chosen frames of a type containing a higher amount of video data content and of a selected level over the network channel utilizing a reliable communication protocol, and sending the chosen frames of a type containing a lower amount video data content and of a selected level over the network channel utilizing an unreliable communication protocol.

Still farther, there is provided in accordance with the present invention a video server system for transporting video from a plurality of video sources over a network channel to a video client, each video source consisting of a plurality of frames of video data, each frame of video data consisting of a single compression level and being of a particular type, the video server system comprising a plurality of video servers, each video server associated with a single video source at a particular compression level, each video server comprising receiver means for inputting fames of video data from the video source associated with that particular video server, sending means coupled to the receiver means, the sending means for determining which frames having a particular type to transmit in accordance with the available bandwidth of the network channel, the sending means for encapsulating the frames of video data into a plurality of packets for transmission over the network channel, a controller for managing the operation of the receiver means and the sending means, and a rate controller for determining which video server to utilize for transmission of video data based on the available bandwidth of the network channel.

The sending means comprises means for interfacing the video server to the rate controller, a bandwidth measurement unit for measuring the available bandwidth of the network channel, a packet generator for inputting video frame data output by the receiver means, the packet generator for encapsulating the video frame data into a plurality of packets for transmission, the packet generator determining which frames having a particular type are to be transmitted, a packet transmitter for placing onto the network channel the plurality of packets output by the packet generator, and a receiver for receiving acknowledgments sent by the video client over the network channel in response to packets received thereby.

BRIEF DESCRIPTION OF THE DRAWINGS

The invention is herein described, by way of example only, with reference to the accompanying drawings, wherein:

FIG. 11 is a high level flow diagram illustrating the scan phase of the bandwidth measurement portion of the present invention;

FIG. 12 is a high level flow diagram illustrating the fixed phase of the bandwidth measurement portion of the present invention;

DETAILED DESCRIPTION OF THE INVENTION

Notation Used Throughout

The following notation is used throughout this document.

| Term | Definition |
|------|------------|
| AVI  | Audio Video Interleaved |
| CPU  | Central Processing Unit |
| GOP  | Group of Pictures |
| GUI  | Graphical User Interface |
| IP   | Internet Protocol |
| ISDN | Integrated Services Digital Network |
| LAN  | Local Area Network |
| MPEG | Motion Picture Expert Group |
| POTS | Plain Old Telephone Service |
| RSVP | Reservation Protocol |
| TCP  | Transmission Control Protocol |
| UDP  | User Datagram Protocol |

Note that throughout this document, the term video is meant to encompass both video data and audio data.

System Overview

Figure 1:
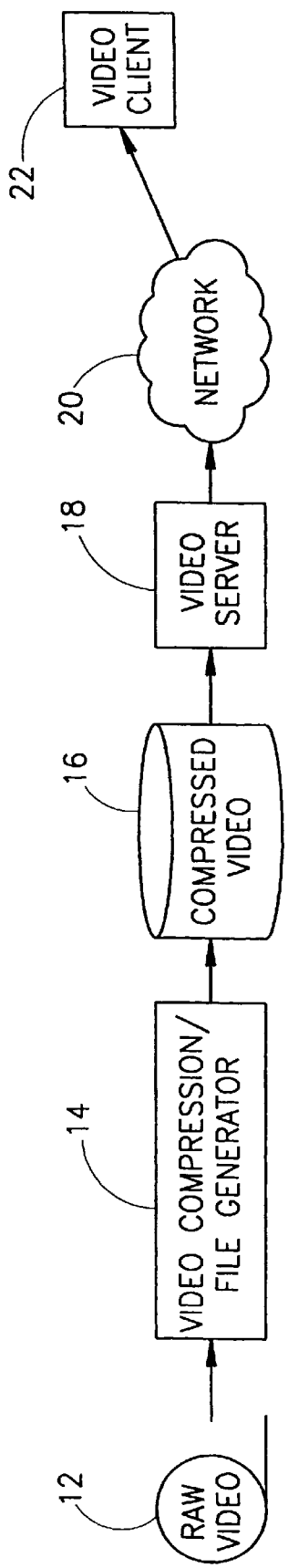
FIG. 1 is a high level block diagram illustrating the adaptive video transport system of the present invention including the video compression/file generator, video server and video client.

The present invention is a system for adaptively transporting video and audio over networks wherein the available bandwidth varies with time. The invention has application to any type of network including those that utilize the Internet Protocol (IP) such as the Internet or any other TCP/IP based network. A high level block diagram illustrating the adaptive video transport system of the present invention is shown in FIG. 1. The system, generally referenced 10, comprises a video compression/file generator 14, video server 18 and one or more video clients 22. Only one video client is shown for clarity sake.

The video compression/file generator 14 in combination with the video client 22 comprise a video/audio codec or coder/decoder that functions to compress, code, decode and decompress video streams that are transmitted over the network 20 into a compressed video and audio file. The compressed file may be in any suitable format such as Audio Video Interleaved (AVI) format. Note that the network may comprise any type of network, TCP/IP or otherwise including the Internet. The generation of the compressed video and audio file 16 can be performed either online or off-line. Typically, the video and audio file is generated off-line. Note that, any suitable method of video compression can be utilized in the present invention such as described in connection with the Motion Pictures Expert Group (MPEG)-1, MPEG-2 or MPEG-4 standards.

One important aspect of the invention is that although the available bandwidth of the network may vary with time and location, the quality of the trnnsmitted video is varied in accordance with the available bandwidth. Depending on the channel bandwidth, the system adjusts the compression ratio to accommodate a plurality of bandwidths ranging from 20 Kbps for plain old telephone service (POTS) to several Mbps for switched LAN environments. Bandwidth adjustability is provided by offering a trade off between video resolution (e.g., 160×120, 320×240, 640×480), frame rate (e.g., 30 fs, 15 fs, 7.5 fps) and individual fame quality. This flexibility is useful for different applications that stress different requirements.

The system functions to generate a prioritized video data stream comprising multiple levels from a raw source of video 12. This video steam is stored in a file (compressed video and audio file 16 in FIG. 1) and accessed by the video server IS when servicing clients 22. In operation, the video client only receives a subset of the levels that form the video and audio file 16. The levels are chosen to have a suitable data content to match that of the network connection between server and client. This permits a better fit between network bandwidth consuned and video image quality. Each of the levels is built on top of the previous levels, with the higher levels providing incremental information not present in the lower levels. This ensures that bandwidth is not wasted on the client end or on the encoder/server side. The system generates the video stream that is sent to the client such that a loss of any individual packet on the network will not cause sustained degraded quality at the client.

The scaleable compression performed by the system is suitable for transparent video within an Internet environment characterized by large diversity and heterogeneity. The system functions to match the image quality of the video data being transported with the wide variations in available network bandwidth. In addition, the system can adjust the video data to match the differences in available computing power on the client computer system. The system, utilizing 'best effort' protocols such as those found on TCP/IP networks, adapts to the time varying nature of the available bandwidth.

During the transport of video data, the server process functions to employ an adaptive congestion control method. The method estimates the network bandwidth or link capacity and adjusts the amount of video data to be sent over the link accordingly. The system of the present invention can be adapted to exploit the bandwidth reservation (RSVP) protocol and quality of service features of TCP/IP networks that are currently evolving.

Figure 2:
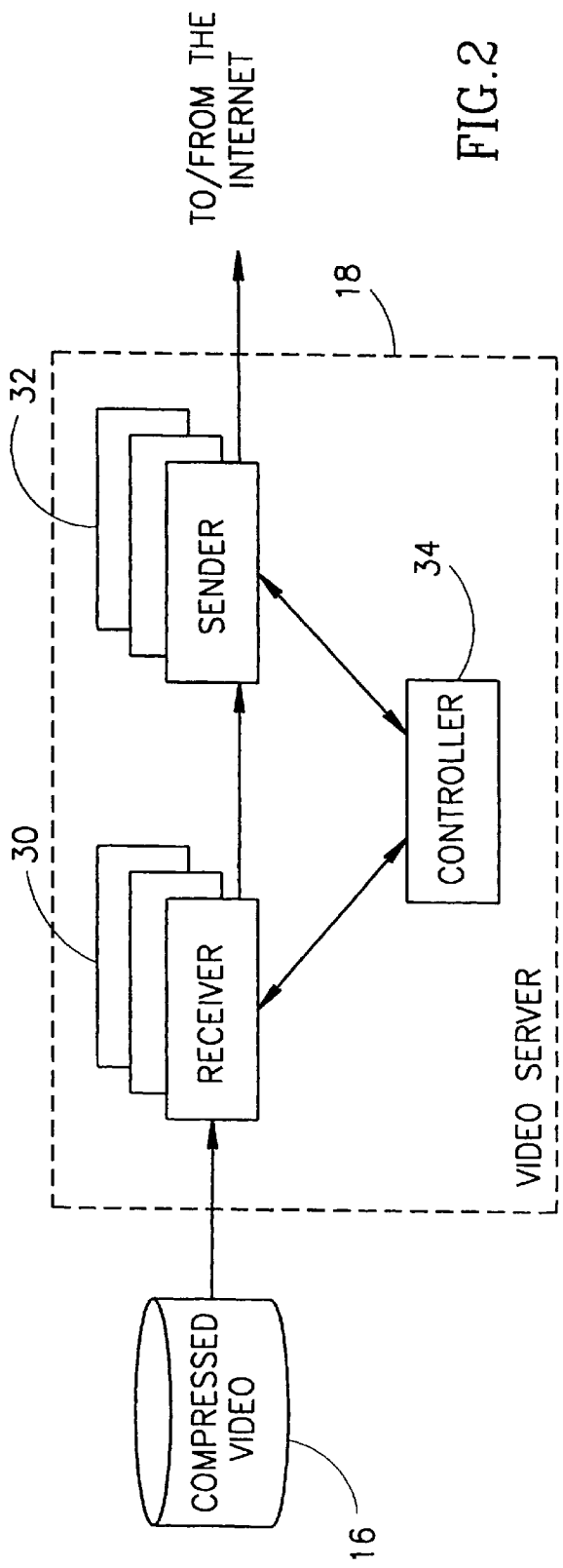
FIG. 2 is a high level block diagram illustrating the video server portion of the present invention in more detail.

A high level block diagram illustrating the video server portion of the present invention in more detail is shown in FIG. 2. The video server 18 comprises one or more receivers 30, one or more senders 32 and a controller 34. During operation, a receiver instance is created for each request for a different video object. The data input to the receiver may be provided from an AVI file data file, for example. The video data file may be located on the same computer as the video server or may be located on a remote computer. The video data file can be stored on a single computer, e.g., video server, or on multiple platforms, e.g., multiple video servers, as described in more detail below. In this case, the video data is transmitted over a network that connects the remote video data and the video server. Each instance of the receiver 30 functions to receive data from the video data file that was previously generated by the video compression/file generator module 14.

The sender functions to accept video frame data from the receiver and encapsulate the video data into packets for transmission of the network to the client. Each client that requests a connection to be established causes an instance of the sender to be created. Requests for multiple video sources from the same client cause additional instances of the sender to be created. The sender functions to assemble packets for transmission from the video source data input to the receiver. The packets are formed on the basis of the current choice for the level of video transmission quality. Based on bandwidth measurements, the sender determines the appropriate level of quality to transmit to the client to best match the available bandwidth. Assembled packets are sent to the network for delivery over the network connection to the video client(s).

The sender also measures the available bandwidth of the network connection between the video server and the video client. As described in more detail, the sender utilizes the bandwidth measurements to determine the appropriate video quality level to send over the connection. If too low a video quality is chosen then network bandwidth is wasted and a better picture could be hand the client display. On the other hand, if too high a video level is chosen then too much data may become lost or computed which also causes the quality of the picture on the client display to suffer.

The controller 34 functions to manage the plurality of receivers, the plurality of senders, the assembly of packets from the video source file, delivery of the packets over Me network connection and measurement of the bandwidth of the network connection. The sender is described in more detail hereinbelow.

Figure 3:
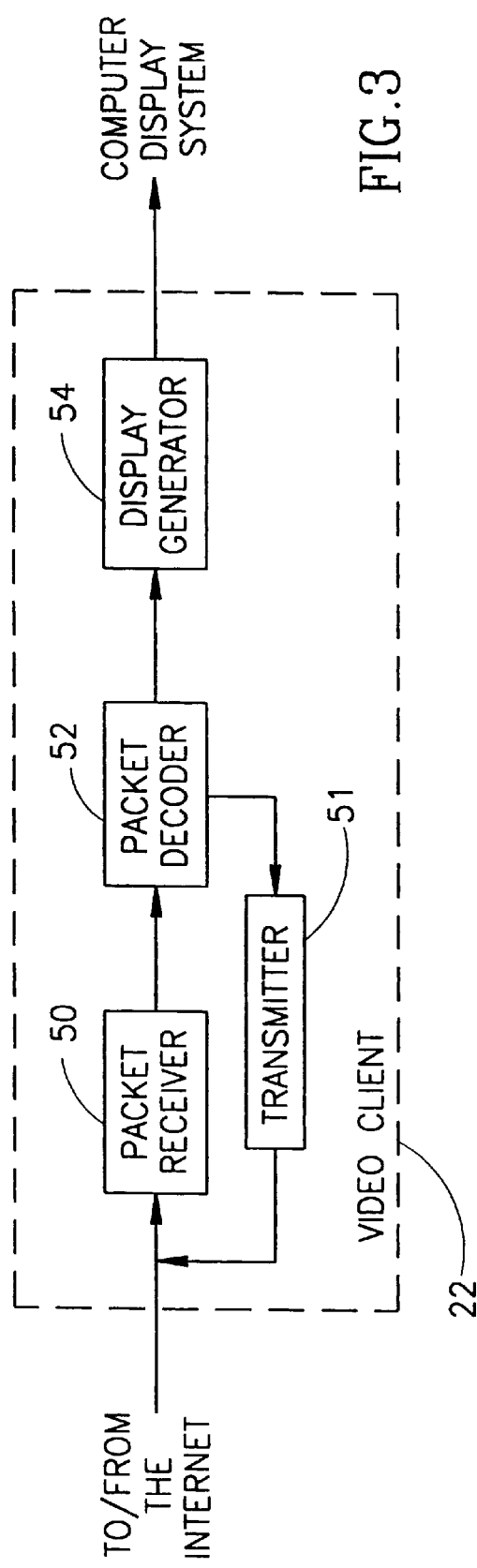
FIG. 3 is a high level block diagram illustrating the video client portion of the present invention in more detail.

A high level block diagram illustrating the video client portion of the present invention in more detail is shown in FIG. 3. The video client 22 comprises a packet receiver 50, packet decoder 52, a display generator 54 and a transmitter 51. The packet receiver functions to receive video packets as they come in from the network connection. The video stream data is removed and input to the packet decoder 52. The packet decoder functions to decode and decompress the video data stream and sends the decoded/decompressed video stream to the display generator 54. The display generator functions to prepare the video data for actual transmission to and display on the host computer's display subsystem. In addition, the packet decoder functions to generate acknowledges in response to the reception of packets from the video server. The acknowledges, in addition to other status information, are sent back to the video server via the transmitter 51.

Video and Audio File Generation and Format

The generation of the video source file, e.g., video and audio file 16 (FIG. 1), and its internal format will now be described in more detail. As previously described, the video source file used by the video server to generate the video stream that is sent over the network connection to the client is created by the video compression/file generator 14 (FIG. 1). The input to the compression/generator is a raw video source 12. The raw video source can be, for example, a non compressed AVI file, a non compressed QuickTime file or a compressed MPEG-1 audio/video file.

The function of the video compression/file generator is to compress the raw video source into multiple levels of varying quality. In particular, the raw video source is compressed into three types of data objects commonly referred to as frames. The three types of frames include Key frames, P frames and B frames. These frames are similar to the I frames, P frames and B frames, respectively, as described in the MPEG-1 specification standard (officially designated as ISO/IEC 11172) and the MPEG-2 specification standard (officially designated as ISO/IEC 13818).

Figure 4:
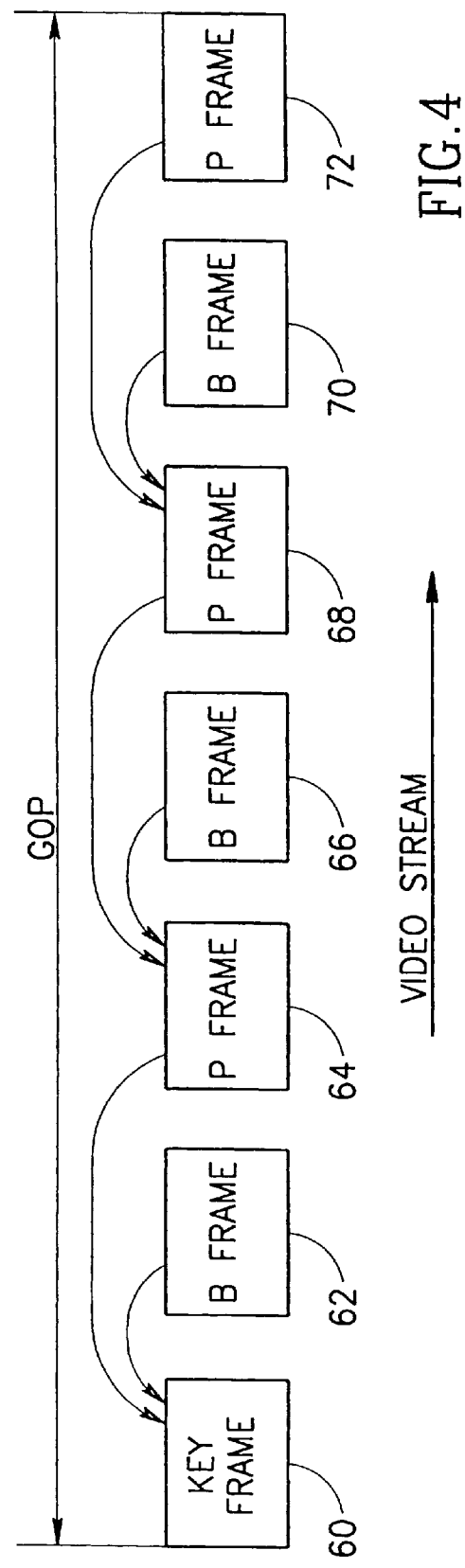
FIG. 4 is a block diagram illustratrng an example group of pictures (GOP) comprising a key frame and a plurality of P and B frames.

The compressed video stream that is sent to the client comprises a plurality of data units termed 'groups of pictures' or GOPs. A block diagram illustrating an example group of pictures (GOP) comprising a key frame and a plurality of P and B frames is shown in FIG. 4. A group of pictures or GOP comprises a sequence of frames made up of a combination of Key, P and B frames. Each GOP has a single Key fame as the first frame which is followed one or more P and B frames.

P frames are dependent on other frames in that they contain incremental changes to video data that was delivered previously either in a Key frame or another P frame. B frames are also dependent on other frames in they contain incremental changes to video data that was delivered previously either in a Key frame or a P frame. Note that B frames never contain data that modifies a previous B frame. Therefore, a B fame may be lost during transmission without having any effect on the following frames in the GOP sequence.

With reference to FIG. 4, the example GOP is shown comprising a Key frame 60, three B fames 62, 66, 70 and three P frames 64, 68, 72. Each GOP typically represents a particular unit or chunk of video information such as a scene in the video. For example, depending on the compression technique used, drastic scene changes may trigger the generation of a new GOP headed by a new Key frame. The video stream, as shown by the arrow, is made up of a sequence of GOPs transmitted one after the other. Each of the three types of frames will now be described in more detail.

Key frames are constructed so as to incorporate all the video information that is essential for the decoding and display of P and B frames. Key frames typically are the largest in terms of data size of the three frames. It is possible that only partial information from the key frames gets delivered to the client. If Key frames are lost or arrive damaged, the subsequent P and B frames cannot be used as they build on the data contained in the Key frame.

The video data incorporated into P frames includes data that is predicted based on a previous Key frame or a previous P frame. The information that is included within a P frame is mainly the motion estimation information which is essential for the decoding and display of the P and B frames. In the event that Key frame information is missing, i.e., a Key frame was skipped or lost, all the subsequent P frames based on that particular K frame will be ignored in order to prevent visual artifacts. The video server utilizes the fact that partial Key frame information is missing, based on feedback from the video client, to skip sending subsequent P frames that are based on the corrupted or lost Key frame in order to conserve bandwidth.

The video data incorporated into B frames includes motion estimation information that is based on the information that was previously sent either in a Key frame or a P frame. Note that B frames are never based on a previously sent B frame. When certain Key frame or P frame data is missing, i.e., a Key or P frame was skipped or lost, all the B frame data subsequent to the lost frame is slipped by the video server in order to conserve bandwidth.

The raw video source is compressed into multiple types of frames comprised of video data having varying degrees of quality since the network cannot guarantee any particular bandwidth or an error free network connection. Thus, these multiple frame types can be assigned varying degrees of importance or priority. The most important of all the frame types are the Key frames which are assigned the highest priority. Being the most important, key frames are sent using a reliable mechanism. Such a reliable mechanism includes using a network protocol such as TCP or reliable UDP. Reliable UDP refers to utilizing UDP, a basically unreliable protocol, in combination with a reliable mechanism that sits at a higher layer in the communication stack such as the Application Layer. The upper communication levels ensure that packets are delivered to the client.

The second most important frame type are the P frames which are transmitted using a semi reliable protocol such as reliable UDP as described above. If P frames are lost or corrupted en route to the video client, the video server may or may not resend them. For example, if too much time has passed, replacement packets would arrive at the client too late for display.

The least important frame type are the B frames which are sent using an unreliable protocol such as UJDP. The B frame data may or may reach the video client due to the condition of the network connection between the server and the client Upon arrival at the client of B frame data, the client determines whether it is useful and should be displayed. If the client determines that the B frame is not usable, an interpolgion mechanism is used to improve the video quality.

As described previously, the video steam stored in the video and audio source file (compressed video and audio file 16 in FIG. 1), is made up of three type of frames, i.e., Key framnes, P frames and B frames, that are grouped into sequences of GOPs. In addition, each frame type is fiter broken down into multiple levels of detail. In the example protocol and file format disclosed herein, each frame type is further broken down into five different video data levels, numbered 1 through 5. Level 1 contains the least amount of data which represents the lowest video quality and level 5 contains the most amount of data representing the highest quality of video.

Every frame (Key, P and B frames) output by the video compression/file generator is composed of data from all five levels. Thus, the video source file contains data representing a broad variation in output video quality. The video compression/file generator functions to assemble GOPs each having a particular combination of Key, P and B frames. Thus, some GOPs may have fewer or more P and B frames. Each frame, however, contains video data for each of the five quality resolution levels. However, for each GOP, the video client only receives data corresponding to a single level. The video server determines for each GOP the appropriate level of data to send to the client. Once a video quality level is chosen by the video server, it is used for the entire GOP. Adjacent GOPs can be comprised of different level data However, data of different levels cannot be sent within a GOP.

Figure 5:
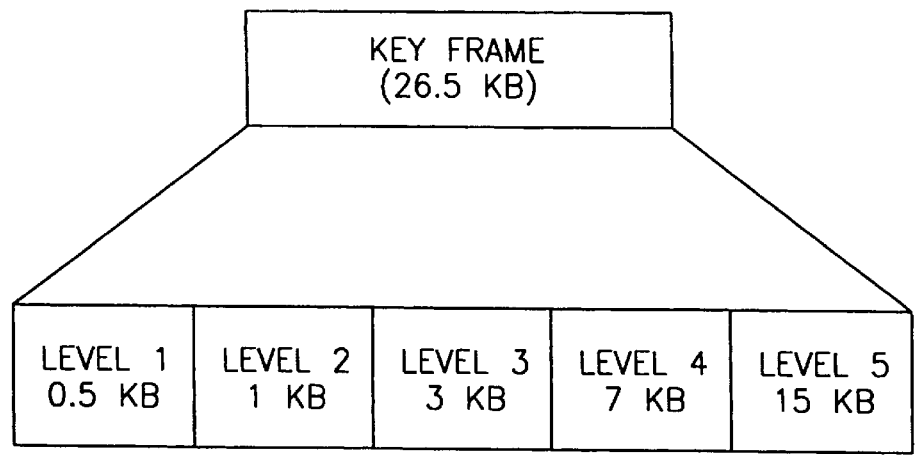
FIG. 5 is a diagram illustrating the five levels of video data that make up a Key fame as stored in the file format of the present invention.

A diagram illustrating the five levels of video data that make up a Key frame as stored in the file format of the present invention is shown in FIG. 5. A sample Key frame and each of its five levels of data of varying resolution and quality is shown in the Figure. Each level is shown with a corresponding data size. The data size for the levels is 0.5 KB, 1 KB, 3 KB, 7 KB, 15 KB which correspond to levels 1, 2, 3, 4, 5, respectively. Thus, the total data size of the sample Key frame for all five levels is 26.5 KB. The data sizes in FIG. 5 and the subsequent Figures represent an example file and are for illustration purposes only. However, the relative sizes of the data for each of the levels does increase when going from level 1 towards level 5. This is to be expected since level 5 contains the highest quality video data.

Figure 6:
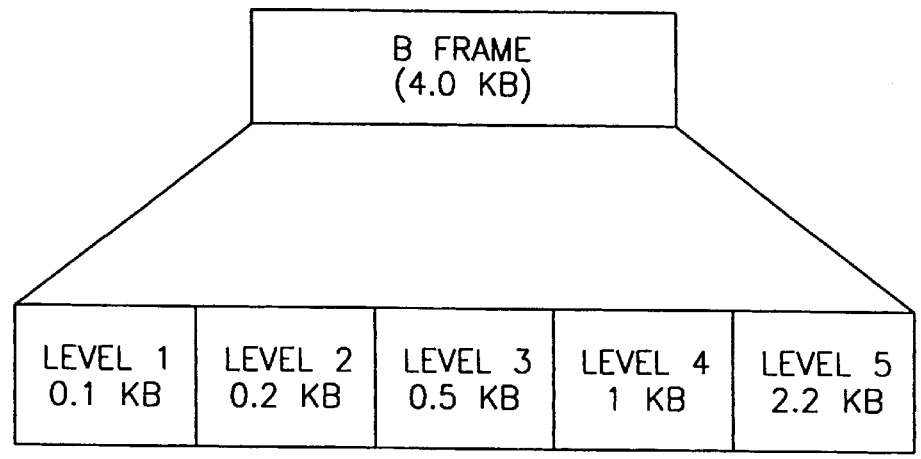
FIG. 6 is a diagram illustrating the five levels of video data that make up a P frame as stored in the file format of the present invention.

A diagram illustrating the five levels of video data that make up a P frame as stored in the file format of the present invention is shown in FIG. 6. A sample P frame and each of its five levels of data of varying resolution and quality is shown in the Figure. Each level is shown with a corresponding data size. The data size for the levels is 0.1 KB, 0.2 KB, 0.5 KB, 1 KB, 2.2 KB which correspond to levels 1, 2, 3, 4, 5, respectively. Thus, the total data size of the sample P frame for all five levels is 4 KB.

Figure 7:
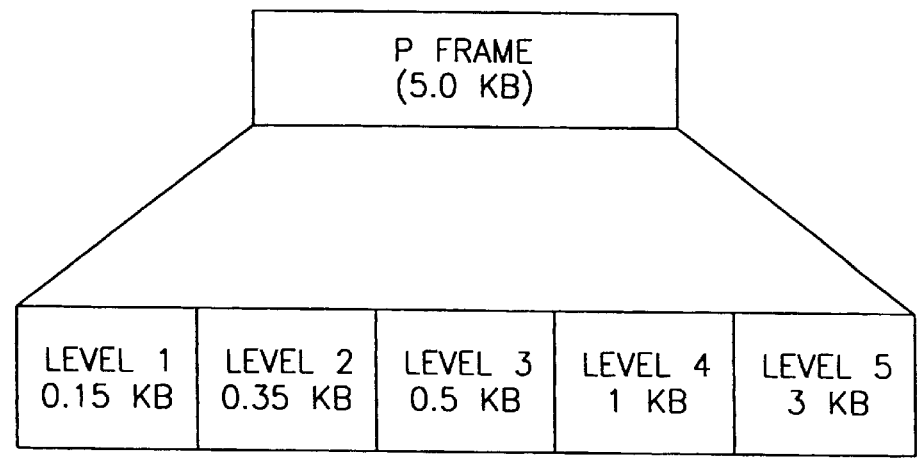
FIG. 7 is a diagram illustrating the five levels of video data that make up a B frame as stored in the file format of the present invention.

A diagram illustrating the five levels of video data that make up a B frame as stored in the file format of the present invention is shown in FIG. 7. A sample B flame and each of its five levels of data of varying resolution and quality is shown in the Figure. Each level is shown with a corresponding data size. The data size for the levels is 0.15 KB, 0.35 KB, 0.5 KB, 1 KB, 3 KB which correspond to levels 1, 2, 3, 4, 5, respectively. Thus, the total data size of the sample B frame for all five levels is 5.0 KB.

Figure 8:
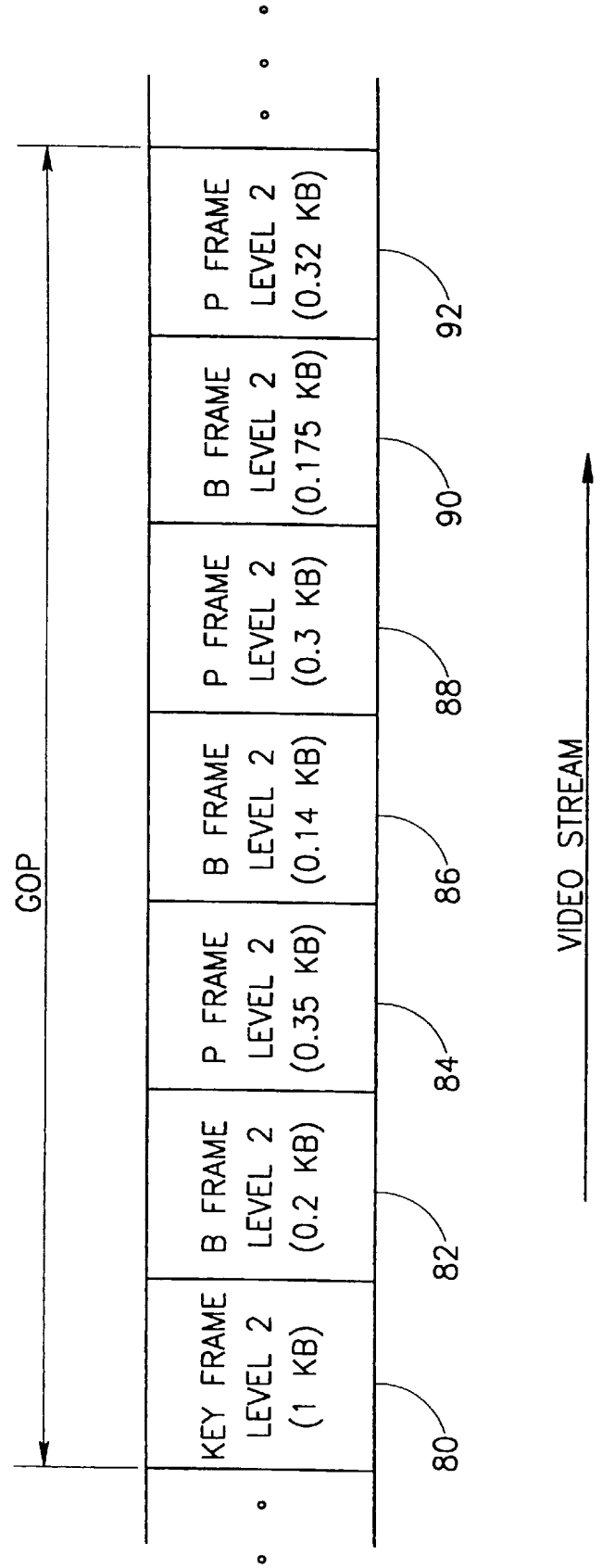
FIG. 8 is a diagram illustrating a sample group of pictures sequence composed of Key, P and B frames making up a video stream.

A diagram illustrating a sample group of pictures (GOP) sequence composed of Key, P and B frames making up a video stream is shown in FIG. 8. In this example, the video server has determined that level 2 data should be sent for this GOP. Thus, the Key frame 80, B frames 82, 86, 90 and P frames 84, 88, 92 are shown depicting level 2 data and associated data size. The total data size of the GOP is 2.485 KB.

Video Server Process

The video server portion of the video transport system of the present invention will now be described in more detail. The function of the video server is to accept a remote client connection request, retrieve a local or remote stored file and transmit it to the client. Before and during the transmission of the video information, the server appropriately adjusts the rate of data flow from the server to the client. The rate is adjusted beforehand based on initial estimation of the bandwidth of the data channel. In addition, the data rate is adjusted during transmission using a bandwidth measurement method that uses statistical evaluation of he connection between the server and the client. The dynamic adjustment of the data rate by the server functions to allow the client to receive video having a quality that matches the bandwidth capacity of the connection. Further, during the server/client connection, the client can control the transmission of the data by the server, thus performing a video on demand function.

The acknowledge packet sent by the client comprises an identification of the last received packet, its arrival time and a list of any packets missed since the transmission of the previous acknowledge.

Figure 9:
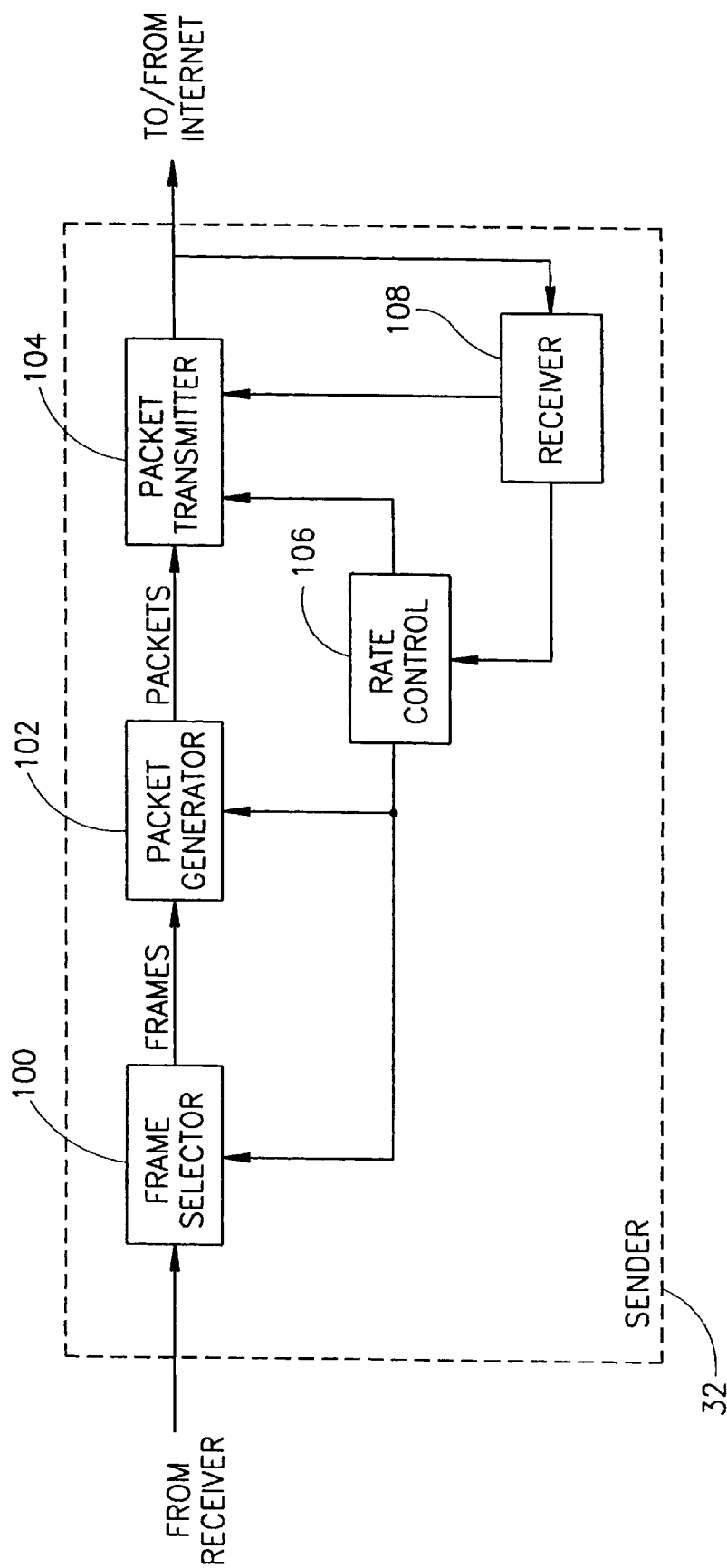
FIG. 9 is a high level diagram illustrating the sender portion of the video server in more detail.

A high level diagram illustrating the sender portion of the video server in more detail is shown in FIG. 9. The sender 32 comprises a frame selector 100, packet generator 102, packet transmitter 104, rate control unit 106 and receiver 108. In operation, the frame selector functions to accept the full frame video data containing all five levels of data from the receiver and select out of the five levels of data, the level of data appropriate for the connection with a parcular client. The choice of what compression level to send is made on a client by client basis, The frame selector used bandwidth information provided by the rate control unit 106 to determine which of the five levels of data to pass to the packet generator. It is important to note that the raw video source data may me compressed into more or less than five levels. A higher number of levels permits a finer tuning of the available bandwidth to the amount of data sent over the connection.

In combination with the estimated bandwidth measurement, the frame selector utilizes a level bandwidth table in determining which level data to select. A different level bandwidth table is associated with each video source file. The level bandwidth table contains an entry for each of the five possible compression levels. Each entry contains the average bandwidth necessary to transmit the data at that level. The frame selector chooses a level having the most information content that the network connection can support using the bandwidth measurements performed by the rate control unit For example, the level bandwidth table for a sample video source file may be as follows.

| Level | Bandwidth Required (Kbps) |
|-------|---------------------------|
| 5     | 200                       |
| 4     | 100                       |
| 3     | 50                        |
| 2     | 20                        |
| 1     | 10                        |

If, for example, the rate control unit measures the bandwidth of the network connection to be 25 Kbps, the frame selector would pass only level 2 data to the packet generator. Thus, the output of the frame selector would comprise a sequence of video frames wherein each video frame contains data from only one of the video compression levels (level 2 data in this example).

It is important to note for the very first video frame or packet that is to sent to the client, no bandwidth measurement is available. This is because, the bandwidth measurement method, as described in more detail below, utilizes transmitted packets to determine the bandwidth of the channel. Thus, before the first packet is sent, a different mechanisms is used to initially determine the bandwidth of the channel. In its request to open a video source, the video client transmits to the server the bandwidth of the connection the last time the client was connected to a server. This mechanism is based on the assumption that the previous connection a client had with a server is similar to the present connection. In the case where a computer is attached to TCP/IP networks via two ways, e.g., dial up modem and high speed LAN, this mechanism does not provide an accurate initial bandwidth estimate.

The packet generator 102 functions to receive the frames having video data from a particular compression level and encapsulate them into packets for transmission over the network. The assembled packets are output to the packet transmitter 104 which is responsible for delivery of the packets over the network. In addition, to preparing packets from the frames received, the packet generator functions to determine which (if any) frames to skip. Depending on the measured bandwidth of the channel, the packet generator may skip frames in order to reduce the transmitted bit rate. This occurs when the bandwidth of the network connection cannot support transmission of every Key, P and B frame. The method of choosing which frames to select is described in more detail hereinbelow.

The packet generator does not send packets to the packet tter 104 until requested to do so by the packet transmitter. The delivery of the packets onto the network is controlled by the rate control unit 106. The rate control unit keeps track of the amount of video information in terms of time that is queued for display at the client In addition, the video frames from the video source are time stamped for synchronization purposes. The rate control unit uses acknowledges received by the client via the acknowledgment receiver 108 to determine the next packet transmission time. Once the packet transmitter is notified to send the next packet of data, it requests a packet from the packet generator.

Notification of acknowledges or ACKs received by the receiver 108 are also input to the packet transmitter in order to assure proper receipt by the client. In addition, the packet transmitter maintains a buffer of packets transmitted to the client. In the event the video server determines to resend a packet, the packet transmitter retrieves the packet from the buffer. Once receipt of a packet is acknowledged by the client, the packet is deleted from the buffer and the buffer space is freed up.

Network Bandwidth Measurement Process

Figure 10:
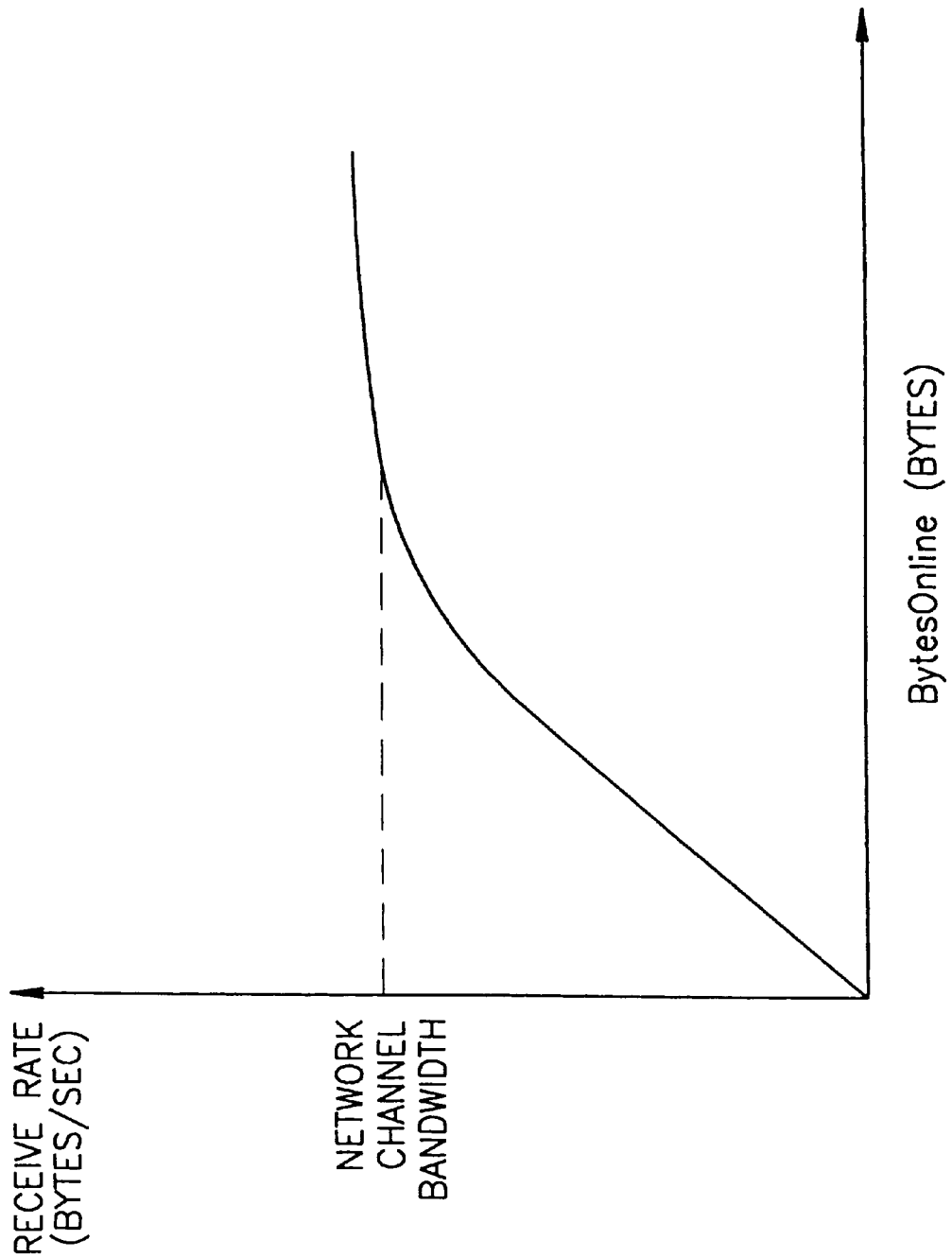
FIG. 10 is a graph illustrating the receiver bit rate versus the number of bytes online.

The bandwidth measurement method as executed by the rate control unit 106 in the sender will now be described in more detail. The bandwidth measurement method actually comprises two separate phases. The first phase being a scanned phase and the second being a fixed phase. In general, the bandwidth measurement-method operates by transmitting packets through the network connection and measuring the rate of reception of the packets at the client. A graph illustrating the receiver bit rate versus the number of bytes online is shown in FIG. 10. The number of bytes transmitted into the network pipe is increased slowly until a point is reached where bytes are not received any quicker at the client. The term bytes on line means the number of bytes or packets that have been transmitted by the server or the sender but not yet received by the client. During this scan phase portion of the bandwidth measurement method, the 'immediate' flag is set 'on' for each packet sent by the sender. This causes the client to send an acknowledge packet for every packet received. Thus, the sender should receive an acknowledge packet for every packet transmitted to the client As shown in FIG. 10 as the number of packets or bytes online increases, a point is reached where the client does not receive packets any faster. The corresponding receive rate at this point can be modeled as an estimate of the bandwidth of the network channel.

The scan phase portion of the bandwidth measurement method will now be described in more detail. A high level flow diagram illustrating the scan phase of the bandwidth measurement method of the present invention is shown in FIG. 11. As stated previously, the immediate flag is set 'on' for all packets transmitted by the sender during the scan phase of the bandwidth measurement method. This forces the client to immediately send an acknowledge packet for every packet received over the channel. In addition, an acknowledge packet is also sent if the last received packet has a sequence number greater than the sequence number of the last received packet. In this case, a packet loss event has occurred. Also, an acknowledge packet is sent if the previous acknowledge was sent more than an predefined time out period ago. For example, if the time out period is 3 seconds, an acknowledge is sent if the last packet was received more than 3 second ago.

The acknowledge packet sent by the client contains an identification of the last received packet, it's arrival time and a list of any packets missed since the transmission of the previous acknowledge. Initially, the recommended bytes online (RecommendedBytesOnline) is set equal to the size of the packet (PacketSize) (step 110). In the next step, a single packet is sent by the sender to the client (step 112). The current number of bytes online (BytesOnline) is then calculated (step 114). The number of BytesOnline can be calculated since the sender has knowledge of each packet that is placed into the network pipe in addition to having knowledge of each acknowledgment received from the clienl Thus at any one time the sender is aware of outstanding packets still in the network pipe. Next, the number of bytes online is compared to the recommended bytes online (step 116). The number of bytes online can be calculated using the sequence number of the last packet that was sent, as known by the sender, subtracted from the sequence number of the last packet acknowledged. Both these entities are known by the sender and thus the number of bytes online can be calculated. If the number of bytes online are less than the recommended bytes online then control returns to step 112 and an additional packet is placed into the network pipe. In this manner he number of bytes online is made equal to the recommended bytes online.

After the packet is sent, a time out is then set to a particular value, for example, 1000 (step 118). The sender than waits for ether an acknowledgment or a time out to occur (step 120) If a time out occurs then control is returned to step 112 since the packet is assumed lost and another packet is then sent (step 122). If an acknowledgment was received, the number of acknowledged bytes online (AckBytesOnline) is then calculated (step 124). The acknowledged bytes online is equal to the recommended bytes online for the last acknowledged packet. Each packet that is sent by the sender has associated with it a number indicating the recommended bytes online at the time that particular packet was sent. This number is stored in a log at the sender and associated with the particular packet that is transmitted. When a packet is acknowledged the recommended bytes online for that particular acknowledge packet is recalled. If the value of the acknowledged bytes online is less than the recommended bytes online than control returns to step 112 and another packet is placed into the network pipe (step 126). If the number of acknowledged bytes online is equal to the number of bytes online than the receiving bandwidth is then calculated (step 128).

The effect of these steps is to keep the number of packets or bytes in the network pipe constant and in a steady state. The receiving bandwidth is calculated from the sending speed since an acknowledge is received for every packet that is placed into the pipe. This assumes that an acknowledge packet is sent immediately upon the client receiving a packet from the sender. If the receiving bandwidth of the pipe has not been exceeded then the sending rate at the sender should be equal to the receiving rate at the client. Thus, as long as the maximum bandwidth of the channel is not exceeded, the sending rate can be modeled as the receiving rate and correspondingly the receiving bandwidth can be computed.

It is then determined whether the receiving bandwidth has leveled off (step 130). With reference to FIG. 10, in this step, it is checked whether the number of bytes online has begun to level off as shown in the right most portion of the curve in the Figure. The leveling off of the receive bandwidth is detected by comparing the current receiving bandwidth to the average of the last five values of the receiving bandwidth. If the latest value of the receiving bandwidth is within 5% of the average then the receiving bandwidth is considered to have leveled off. Consequently, the bandwidth of the network connection is estimated to be the value of the last received bandwidth. If the receiving bandwidth has not leveled off, i.e., within 5% of the average of the previous five measurements, then the recommended bytes online (RecommendedBytesOnline) is incremented by the packet size (step 132). Control then returns to step 112 and an additional packet is placed into the network pipe.

If the receiving bandwidth is found not to have leveled off it means the number of bytes online corresponds to the linear portion of the curve in FIG. 10. Thus, the maximum bandwidth of the network pipe has not been reached and additional packets can be pumped into the network channel. If the receiving bandwidth has been found to have leveled off the recommended bandwidth (RecommendedBW) is set equal to the current value of the receiving bandwidth (ReceivingBW) (step 134). The recommended bandwidth value is utilized by the rate control unit as an initial estimate of the bandwidth of the network connection.

The scan phase portion of the bandwidth measurement method is used initially as a relatively crude estimate of the bandwidth of the network channel. During steady state operation of the sender portion of the video server a fixed phase bandwidth measurement method is utilized to better fine tune and track changes in the bandwidth of the network channel. A high level flow diagram illustrating the fixed phase method of the bandwidth measurement portion of the present invention is shown in FIG. 12. During the fixed phase of the bandwidth measurement method the immediate flag is set to 'off' in each packet sent by the sender. The first step is to set a variable representing the time to send (TimeToSend) equal to the current time, i.e., now (step 140). Next, it is checked whether the value of time to send is greater than or equal to the current time (step 142). If the time to send is greater than or equal to the current time, a packet is sent into the network channel (step 150). Information about the packet is then stored in a database (step 152). The information stored in the data base includes the PacketID, PacketSize and the, value of the TimeToSend. A new value for the TimeToSend, which represents the time for transmnission of the next packet, is then calculated based on the current value of the TimeToSend, the RecommendedBW and the PacketSize (step 160). Control then returns to step 142 where it is checked whether it is time to send the next packet.

If the value of the time to send has not been reached, it is then checked whether an acknowledgment has been received (step 144). If an acknowledgment has not been received, control loops back to step 142 and the time to send is checked again. If an acknowledgment has been received, the information contained in the acknowledgment packet is stored in the database (step 146). The information stored in the database includes an acknowledgment packet ID (AckPacketID), the time to receive (TimeToReceive) and the time to acknowledgment (TimeToAck). The value of the acknowledgment packet ID is the value of the ID or sequence number of the acknowledgment packet itself. The time to receive is the time stamp generated by the client which represents the time of arrival of the packet transmitted by the sender that the acknowledgment packet corresponds to. The time to acknowledgment is a time stamp generated by the sender representing the time the acknowledgment packet was received by the video server, In the next step, various entities are then calculated (step 148). The number of bytes sent (BytesSent) by the sender is calculated using the latest response (LastResp) and the previous response (PreviousResp). The data for the previous response and the last response are generated from the respective acknowledgment packets received by the sender. Similarly, the number of bytes received by the client (BytesRec) is calculated using the information contained in the acknowledgment packet for the previous response and the last response. The send rate (SendRate) is then computed by dividing the number of bytes sent by the difference between the time to send (TimeToSend) for the previous response subtracted from the time to send for the last or current response, as shown below.

$$SendRate = \frac{BytesSent}{TimeToSend(PreviousResp) - TimeToSend(LastResp)}$$

Similarly, the receive rate (RecRate) is calculated by dividing the number of bytes received by the time to receive C(imeToRec) for the previous response subtracted from the time to receive for the last response, as shown below.

$$RecRate = \frac{BytesRec}{TimeToRec(PreviousResp) - TimeToRec(LastResp)}$$

The send rate is then compared to the received rate (step 154). If the sending rate is less then or equal to the receiving rate this means the network connection is being underutilized and a portion of the bandwidth remains unused. In this case, the recommended bandwidth is increased by a particular amount, for example 10% (step 158). If the sending rate is greater than the receiving rate this means too much data is being pumped into the network pipe and the sending rate needs to be reduce Thus, the recommended bandwidth is set equal to the receive rate (step 156).

Whether the bandwidth is increased or decreased, the next step is to determine the new time to send based on the current time to send, the recommended bandwidth and the PacketSize (step 160), Control then returns to step 142 where it is checked whether the time has arrived to send another packet.

Using this method, the sender constantly tries to utilize the available bandwidth as efficiently as possible by keeping the network pipe fully. In other words, the sender attempts to maintain the number of bytes online to correspond with the bandwidth of the network connection. If the sender senses the bandwidth of the network connection being underutilized it increases the number of bytes online accordingly. Conversely, if the sender detemines that the bandwidth of the network connection is being exceeded it appropriately lowers the sending rate accordingly.

As discussed previously, the packet generator 102 (FIG. 9) receives the video franes for a particular level from the frame selector 100. The function of the packet generator is to encapsulate the video frame data into packets and transmit them to the packet transmitter 104. In addition, the packet generator determines which of the frames it receives to encapsulate into packets and send to the packet transmitter. The packet generator determines which frames to encapsulate based on the recommended bandwidth determined by the rate control unit 106.

Figure 13:
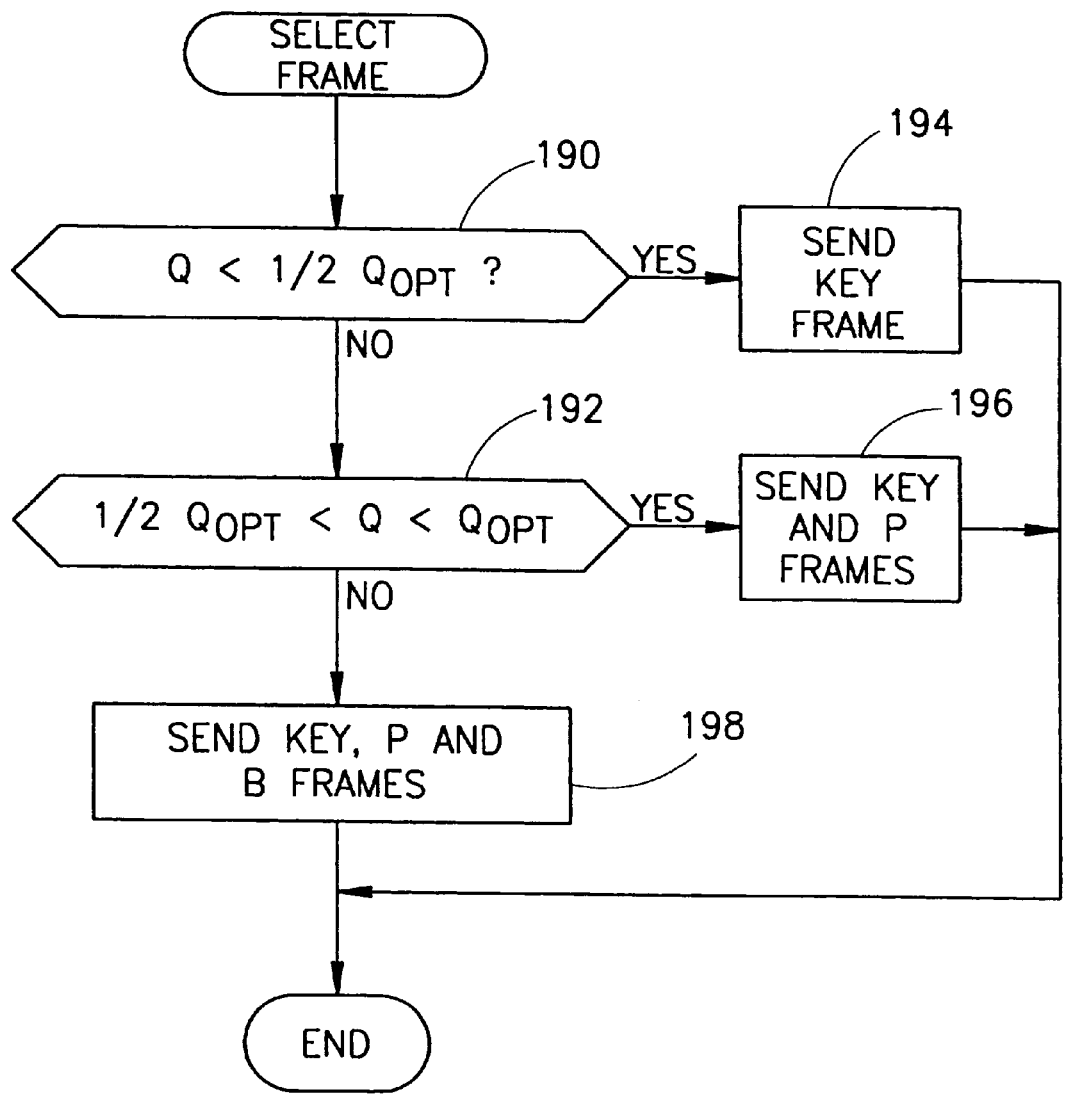
FIG. 13 is a high level flow diagram illustrating the method of selecting frames to be transmitted performed by the sender portion of the present invention.

A high level flow diagram illustrating the method of selecting frames to be transmitted as performed by the sender portion of the present invention is shown in FIG. 13. Initially, the value Q is set to a particular value which represents an optimum size of the queue within the video client. The size of the queue is measured in time, i.e. seconds, and represents the amount of video information currently queued in the video client ready to be displayed. The packet generator uses the current level of this queue to determine which of the Key, P and B frames to send to the packet transmitter.

First, it is checked to see whether the current level of the client queue is less than half of $Q_{OPT}$ which represents an optimum size for the client queue (step 190). If the size of the client queue is less than half of this value than only a Key frame is sent (step 194). In this case only Key frames are sent due to time considerations. The level of the client queue is considered to be too short to send Key, P and B frames.

If the level of the client queue is found to be between half the optimum queue $Q_{OPT}$ and a full optimum queue (step 192), both Key and P frames are sent (step 196). In this case, the client queue is considered to contain sufficient video information in terms of time to permit the transmission of Key and P frames. Lastly, if the size of the client queue is equal to or above the level of the optimum queue, Key, P and B-frames are sent to the client (step 198). In this case, the client queue of considered to contain enough seconds of video to permit enough time to send Key, P and B frames.

As described previously, the packet generator sends packets for transmission to the packet transmitter. For each packet received by the packet transmitter an appropriate method of communications is selected. Key-frames, for example, should be sent using a very reliable communication method since they are used as the basis for both P and B frames. On the other hand, B frames may be sent using an unreliable communication method sine they are less important.

Figure 14:
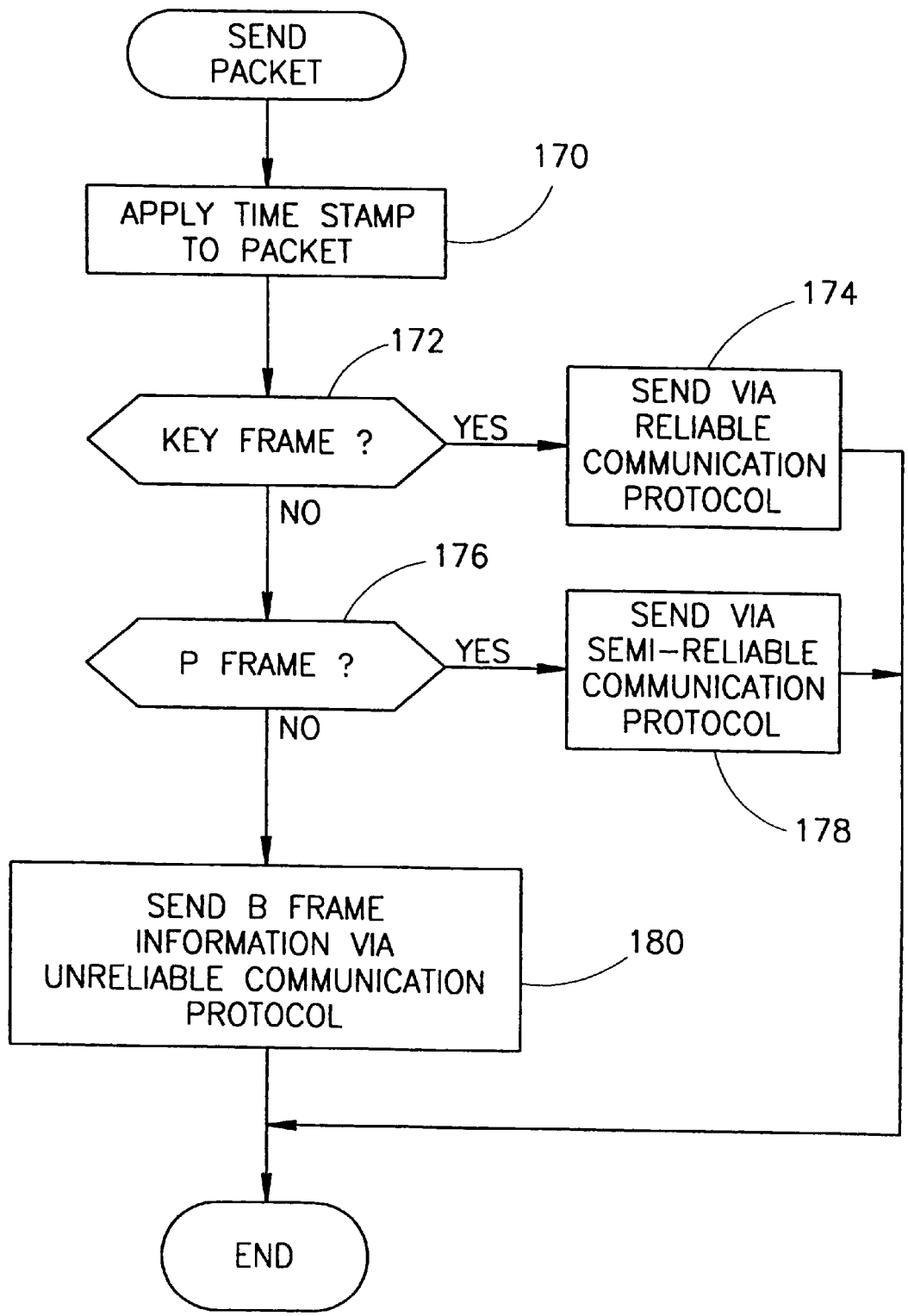
FIG. 14 is a high level flow diagram illustrating the method of sending a packet performed by the sender portion of the present invention.

A high level flow diagram illustrating the method of sending a packet performed by the packet transmitter portion of the present invention is shown FIG. 14. The first step is to apply a time stamp to the packet received from the packet generator (step 170). If the packet contains Key frame data (step 172) then the packet is sent using a best effort communication protocol. The best effort protocol can be an implementation of a reliable UDP which includes the video server retransmitting the Key frame as long as there is enough time for the client to receiver and display it on time. If the packet contains P frame information (step 176) then the packet is sent via a semi reliable communication protocol (step 178). In this case, the server makes a decision based on the available bandwidth whether to resend the P frame information packet to the video client. Lastly, if the packet contains B frame information it is sent via a non reliable communication protocol such as UDP (step 180). In this case, the video server does not have an option to retransmit the packet if not received by the video client.

Video Client Process

The video client portion of the video transport system of the present invention will now be described in more detail. The video client is a graphical user interface (GUI) based process or application that functions to decode a video stream transmitted by the server. In general, the client functions as an off-line video player, capable of playing back local file streams, as well as an online video player utilizing a direct connection to the server. Thus, the video client supports both store and forward as well as real time implementations of video over a network. The client can preferably supply a VCR like GUI display, i.e., play, stop, fast forward, pause, etc. buttons.

During a real time transmission of video data, the client reports back status ad bandwidth related information to the video server via a reverse channel. Based on the number of transmission errors as well as the number of data packets lost, as communicated via the status and bandwidth information sent back to the server, the server make an online determination regarding the quantity of data to send to the client.

As described previously, this online decision forms the core of the adaptive video transport system. The video server makes a detention as to the bandwidth of the connection and the quality of the connection, i.e., rate of packet loss, based on the amount of information received by the video client. Knowledge of the amount of data that each client receives is essential to the server in order to determine the amount and type of data to transmit to each particular video client.

Multi-Platform Video Server

In an alternative embodiment, the video server 18 of FIG. 1 can be constructed using multiple platforms rather than a single platform. In this embodiment, the video server functionality is spread over multiple computer platforms. Each individual platform within the multi platform video server functions to transmit a single video compression level. A high level black diagram illustrating an alternative embodiment of the adaptive video transport system of the present invention including the video compression/file generator, multi-platform video server and video client is shown in FIG. 15.

The adaptive video transport system, generally referenced 200, comprises a video compression/file generator 212, a plurality of video servers #1 through #N 216 and one or more video clients 220. Only one video client is shown in FIG. 15 for clarity sake. The video compression/fle generator 212 in combination with the video client 220 comprise a video codee or coder/decoder that functions to compress, code, decode and decompress videoyaudio streams that are transmitted over the network 218 into a plurality of compressed video/audio files. Each compressed video/audio file is compressed using a different compression level. Each individual video server platform is responsible for transmitting one of video compression levels.

Figure 15:
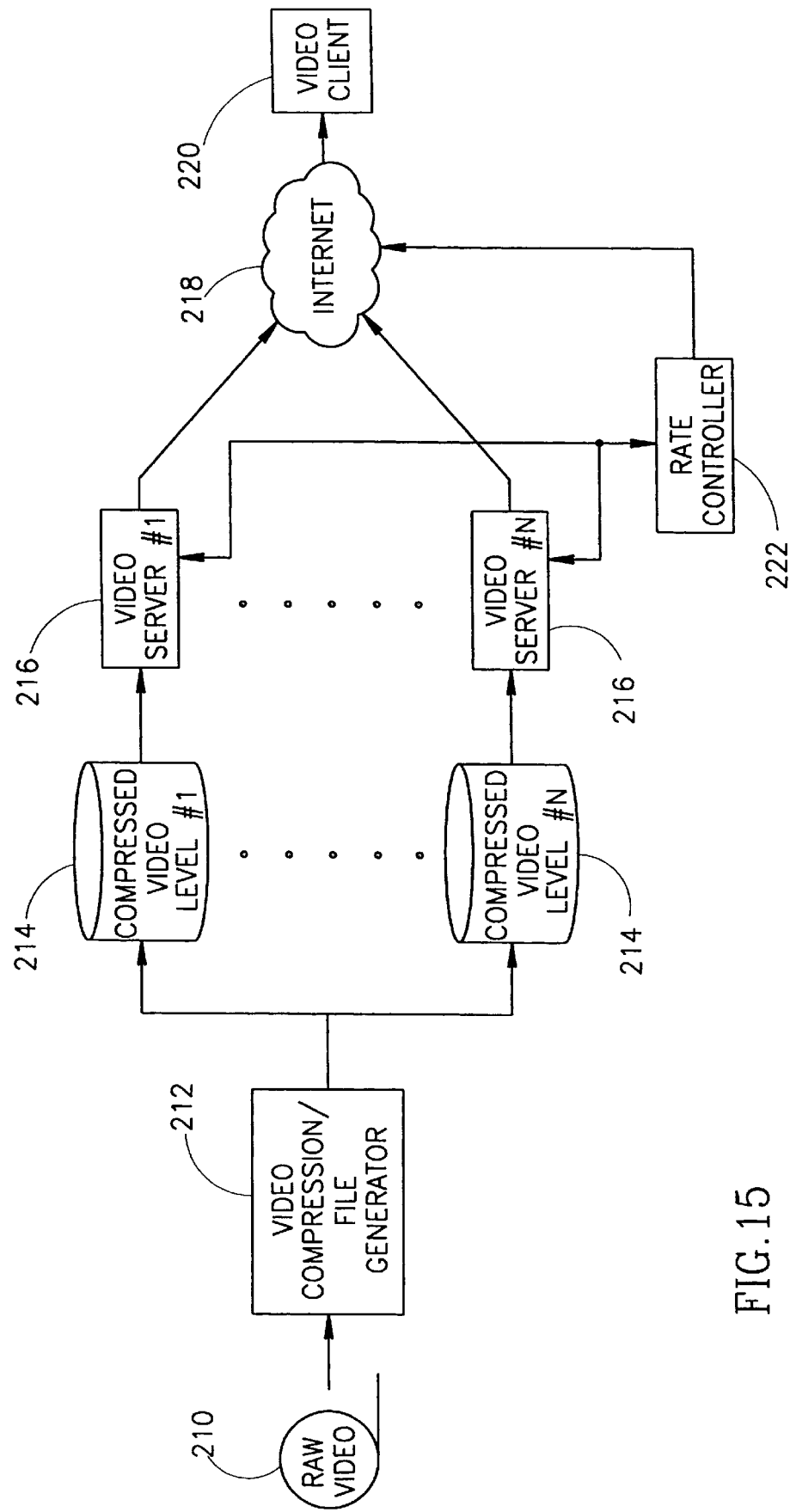
FIG. 15 is a high level block diagram illustrating an alternative embodiment of the adaptive video transport system of the present invention including the video compression/file generator, multi-platforn video server and video client.

The video compression/file generator 212 functions similarly to that of the video compression/file generator 14 of FIG. 1 with the exception that the video compression/file generator of FIG. 15 generates a separate compressed video/audio file for each compression level. For N compression levels, the video compression/file generator 212 functions to generate a compressed video/audio file 214 for levels 1 through N. Considering the system described previously, compressed video/audio files 214 are generated for Levels 1 through Level 5. The compressed video/audio files may be in any suitable format such as AVI format. The generation of the compressed video/audio files 214 can be performed either on-line or off-line. Typically the video/audio file is generated off-line. Note that any suitable method of video compression can be utilized to process the raw video data 210 such as described in connection with the MPEG-1, MPEG-2 or MPEG-4 standards.

In order to serve N bandwidth levels, where each bandwidth level represents a different quality/resolution band, N video servers and N compressed video/audio files are required. One compressed video/audio file and video server are associated with each bandwidth level, i.e., compression level. Thus, the complete video server system comprises N separate video server platforms each handling one compression level. An additional platform 222 functions as a rate controller (bandwidth controller) which performs the scan phase and fixed phase bandwidth measurement methods, frame selection method and packet transmission method as described previously in connection with FIGS. 11 through 14. The rate controller 222 functions as a bandwidth controller executing the bandwidth measurement methods described earlier and is operative to select which of the video servers #1 through #N to transmit to the video client 220. For each client, data from only one video server is sent at any one time. The same video server is used to send data for an entire GOP. However, different video servers can be utilized to send video/audio data for other GOPs since the compression level for a GOP is independent of the compression levels used for other GOPs.

Each of the N video servers 216 can comprise the video server 18 (FIG. 2) described previously or may comprise a standard off the shelf video server such as the MPEG-2 based Media Server from Oracle Inc. or the NetShow Server from Microsoft Corporation, Redmond, Wash. The standard video server must be suitably modified to provide a communication capability with the rate controller 222 before it will operate in the present invention. The modifications typically include providing a communication interface between the standard video server and the rate controller.

The video client 220 functions similarly and is constructed in similar fashion to that of the video client shown in FIG. 3. The video client functions to decode and decompress the video/audio data stream and sends the decoded/decompressed video/audio stream to a display connected thereto. In addition, the video client 220 is adapted to issue the video file requests to the rate controller 222 rather than to any of the video servers 1 through N. Throughout the video transmission session, the video client 220 functions to return acknowledgments and statistics to the rate controller 222. The rate controller uses the acknowledgments and statistics returned by the video client 220 in order to calculate the optimum compression (resolution) level to use.

An advantage of the adaptive video trasport system of FIG. 15 is that performance is enhanced. The performance enhancement is achieved in part by the use of standard video servers which are optimized for performance. Assuming each of the N video servers can generate 250 concurrent 512 Kbps video/audio streams, the complete video server system is capable of generating up to 250×N concurrent 512 Kbps non-scaleable streams and an even higher number of concurrent lower speed 28.8, 56, 128 or 256 Kbps streams. Note that whenever the initial bandwidth is known, for example within an Intranet, the video client will play back video directly from the most suitable server. When the initial bandwidth is unknown beforehand, the rate controller 222 functions to determine the optimum bandwidth for the particular network connection Thus, the alternative embodiment shown in FIG. 15 can be utilized to implement the multi-compression layer and adaptive bandwidth measurement scheme of the present invention by piggy backing on existing standard video server technology and enhancing it to offer scaleable video transmission.

While the invention has been described with respect to a limited number of embodiments, it will be appreciated that many variations, modifications and other applications of the invention may be made.

What is claimed is:

1. A method of transporting video over a network channel, comprising the steps of:
   compressing a raw video source into a plurality of frames, each frame comprising a plurality of levels, each level corresponding to a particular degree of compression;
   estimating the bandwidth of the network channel;
   selecting one of said plurality of levels of each frame to transmit over the network channel in accordance with said bandwidth estimate whereby the level selected optimizes the use of the bandwidth of the network channel; and
   sending said selected level of each frame over the network channel.

2. The method according to claim 1, wherein said step of compressing comprises the step of compressing the raw video source into a plurality of different types of frames, each frame type containing different amount of video content information, said plurality of different types of frames grouped so as to form a video stream consisting of a plurality of group of pictures (GOP) sequences.

3. The method according to claim 1, wherein said step of compressing comprises the step of compressing the raw video source into Key, P and B type frames, said Key, P and B frames generated so as to form a video stream consisting of a plurality of group of pictures (GOP) sequences.

4. A method of transporting video from a video server to a video client over a network channel, comprising the steps of:
   compressing data from a raw video source so as to generate a plurality of frames, each frame being of a particular frame type, each frame type containing a particular amount of video content information, each frame comprising a plurality of levels, each level corresponding to a particular degree of compression;
   estimating the bandwidth of the network channel;
   determining the amount of video information waiting to be displayed at the video client;
   selecting one of said plurality of levels of each frame to send over the network channel in accordance with said bandwidth estimate whereby the level selected optimizes the use of the bandwidth of the network channel;
   choosing which frames having a particular frame type to send over the network channel in accordance with the amount of video information waiting to be displayed at the video client; and
   sending the chosen frames having a particular frame type and of said selected level over the network channel.

5. A video server for transporting video from a video source over a network channel to a video client, said video source consisting of a plurality of frames of video data, each frame of video data consisting of multiple compression levels and being of a particular type, said video server comprising:
   receiver means for inputting frames of video data from the video source;
   sending means coupled to said receiver means, said sending means for determining which compression level within said frame and which frames having a particular type to transmit in accordance with the estimated available bandwidth of the network channel, said sending means for encapsulating said frames of video data into a plurality of packets for transmission over said network channel; and
   a controller for managing the operation of said receiver means and said sending means whereby the rate of transmission of said sending means is maintained so as to match the available bandwidth of the network channel.

6. The video server according to claim 5, wherein said sending means comprises:
   a rate control unit for measuring the available bandwidth of the network channel;
   a frame selector for inputting video frame data output by said receiver means, said frame selector outputting frames of a particular compression level in accordance with the bandwidth measured by said rate control unit;
   a packet generator for inputting video frame data output by said frame selector, said packet generator for encapsulating said video frame data into a plurality of packets for transmission, said packet generator determining which frames having a particular type are to be transmitted;
   a packet transmitter for placing onto the network channel the plurality of packets output by said packet generator; and a receiver for receiving acknowledgments sent by the video client over the network channel in response to packets received thereby.

7. A method of transporting video from a video server to a video client over a network channel, comprising the steps of:

compressing data from a raw video source so as to generate a plurality of frames, each frame being of a particular frame type, each frame type containing a particular amount of video content information, each frame comprising a plurality of levels, each level corresponding to a particular degree of compression;

estimating the bandwidth of the network channel;

determining the amount of video information waiting to be displayed at the video client;

selecting one of said plurality of levels of each frame to send over the network channel in accordance with said bandwidth estimate whereby the level selected optimies the use of the bandwidth of the network channel;

choosing which frames having a particular frame type to send over the network channel in accordance with the amount of video information waiting to be displayed at the video client;

sending the chosen frames of a type containing a higher amount of video data content and of a selected level over the network channel utilizing a reliable communication protocol; and sending the chosen frames of a type containing a lower amount video data content and of a selected level over the network channel utilizing an unreliable communication protocol.

8. A video server system for transporting video from a plurality of video sources over a network channel to a video client, each video source consisting of a plurality of frames of video data, each frame of video data consisting of a single compression level and being of a particular type, said video server system comprising:

a plurality of video servers, each video server associated with a single video source at a particular compression level, each video server comprising:

receiver means for inputting frames of video data from the video source associated with that particular video server;

sending means coupled to said receiver means, said sending means for determining which frames having a particular type to transmit in accordance with the available bandwidth of the network channel, said sending means for encapsulating said frames of video data into a plurality of packets for transmission over said network channel;

a controller for managing the operation of said receiver means and said sending means; and a rate controller for determining which video server to utilize for transmission of video data based on the available bandwidth of the network channel.

9. The video server system according to claim 8, wherein said sending means comprises:

means for interfacing said video server to said rate controller;

a bandwidth measurement unit for measuring the available bandwidth of the network channel;

a packet generator for inputting video frame data output by said receiver means, said packet generator for encapsulating said video frame data into a plurality of packets for transmission, said packet generator determining which frames having a particular type are to be transmitted;

a packet transmitter for placing onto the network channel the plurality of packets output by said packet generator; and a receiver for receiving acknowledgments sent by the video client over the network channel in response to packets received thereby.

10. A method of transporting a video stream over a network channel, comprising the steps of:

a) compressing a raw video source into a plurality of quality levels, each quality level corresponding to a particular degree of compression and having an associated group of pictures sequence;

b) estimating the bandwidth of the network channel;

c) selecting one of the plurality of quality levels in accordance with the bandwidth estimate, wherein the selected quality level optimizes the use of the bandwidth of the network channel during a first time interval; and d) sending the group of pictures sequence associated with the selected quality level over the network channel.

11. The method of claim 10, wherein step a) comprises compressing the raw video source into a plurality of different types of frames, each frame type having video data corresponding to one of the plurality of quality levels.

* * * * *